(12) United States Patent
Leopold et al.

(10) Patent No.: US 8,754,781 B2
(45) Date of Patent: Jun. 17, 2014

(54) CONTROL METHOD FOR A ROAD TOLL SYSTEM

(71) Applicant: Kapsch TrafficCom AG, Vienna (AT)

(72) Inventors: Alexander Leopold, Vienna (AT); Oliver Nagy, Vienna (AT)

(73) Assignee: Kapsch TrafficCom AG (AT)

( * ) Notice: Subject to any disclaimer, the term of this patent is extended or adjusted under 35 U.S.C. 154(b) by 0 days.

(21) Appl. No.: 13/757,565

(22) Filed: Feb. 1, 2013

(65) Prior Publication Data

US 2013/0201035 A1 Aug. 8, 2013

(30) Foreign Application Priority Data

Feb. 2, 2012 (EP) .................................... 12153628
Oct. 18, 2012 (EP) .................................... 12189065

(51) Int. Cl.
- *G08G 1/00* (2006.01)
- *G06Q 30/02* (2012.01)
- *G08G 1/052* (2006.01)

(52) U.S. Cl.
CPC ............ *G06Q 30/0283* (2013.01); *G08G 1/052* (2013.01)
USPC ........... 340/902; 340/905; 340/928; 340/936; 340/937; 340/5.7; 340/5.82; 340/550; 705/13; 705/15

(58) Field of Classification Search
CPC .......................... G06Q 30/0283; G08G 1/052
USPC ......... 340/902, 905, 928, 936, 937, 5.7, 5.82, 340/550; 705/13, 15
See application file for complete search history.

(56) References Cited

U.S. PATENT DOCUMENTS

| | | | |
|---|---|---|---|
| 6,581,004 B2 * | 6/2003 | Mori et al. ..................... | 701/420 |
| 7,817,013 B2 * | 10/2010 | Bazakos et al. ................ | 340/5.7 |
| 2006/0064345 A1 | 3/2006 | Biet | |
| 2006/0142933 A1 | 6/2006 | Feng | |

FOREIGN PATENT DOCUMENTS

| | | |
|---|---|---|
| DE | 3932029 | 6/1990 |
| DE | 102005058033 | 6/2007 |
| EP | 1170702 | 1/2002 |
| EP | 1783692 | 5/2007 |
| WO | 2004027730 | 4/2004 |
| WO | 2011103612 | 9/2011 |
| WO | 2011129800 | 10/2011 |

OTHER PUBLICATIONS

Australian Government, Patent Examination Report No. 1, AU App. No. 2013200444, report dated Nov. 8, 2013.
Extended European Search Report dated Mar. 5, 2013 from the European Patent Office.
Australian Government Patent Examination Report No. 1, including Search Information Statement, AU App. No. 201300478, Kapsch TrafficCom AG, Nov. 11, 2013.
Extended European Search Report mailed Mar. 4, 2013 from the European Patent Office.
Extended European Search Report dated Jun. 15, 2012 from the European Patent Office.

* cited by examiner

*Primary Examiner* — Tai T Nguyen
(74) *Attorney, Agent, or Firm* — Robert J. Irvine, III

(57) ABSTRACT

A control method for a road toll system using vehicle-based on-board units, recording vehicles, control vehicles, cellular mobile communication networks, and switching servers, comprising: registering a recording vehicle identifier and a mobile communication network cell identifier in the switching server; selecting a cell identifier in a control vehicle and transmitting the same with a control vehicle identifier to the switching server; associating the control vehicle identifier with the recording vehicle identifier for which a cell identifier that is identical to the selected cell identifier is registered; detecting a traffic or toll violation by means of the recording vehicle and transmitting a violation data record to the switching server; determining the assigned control vehicle identifier; transmitting the violation data record to the control vehicle identified by the determined identifier; and processing the violation data record in the control vehicle.

12 Claims, 6 Drawing Sheets

CONTROL METHOD FOR A ROAD TOLL SYSTEM

CROSS REFERENCE TO RELATED APPLICATIONS

The present application claims the priority of the European patent application no. 12 153 628.8 of Feb. 2, 2012, and European patent application no. 12 189 065.1, filed Oct. 18, 2012, both of which are hereby incorporated herein by reference.

FIELD OF THE INVENTION

The present invention relates to a control method for a road toll system that is based on on-board units carried by vehicles.

BACKGROUND

In modern road toll systems, vehicles subject to tolls are equipped with on-board units (OBUs), which can be used to locate the vehicles so as to then charge tolls (fees) for their usage of the road. The OBUs can take on a variety of designs: The OBUs can be of the "self-locating" type, which is to say, they can continually determine the locations thereof themselves, for example by means of a satellite navigation receiver as part of a satellite navigation system (global navigation satellite system, GNSS) and report the locations thus determined ("position fixes") either directly to a back office of the road toll system, be it via a mobile communication network or a network of geographically distributed radio beacons, or in the form of "abstracted" toll transactions, which are calculated based on the reported positions. As an alternative, such GNSS OBUs could simply store the reported positions or toll transactions thereof, or debit the fees calculated based thereon from an internal toll credit account. The OBUs can also be of the "externally located" type, for example using a plurality of toll or radio beacons that are geographically distributed over the road toll system and which establish the respective short range communication or DSRC (dedicated short range communication) with passing OBUs and localize them with respect to the known beacon locations thereof due to the limited communication range. Corresponding reported positions, or toll transactions calculated based thereon, can then be generated by the OBUs or the toll beacons and processed either in the OBUs or in the back office.

SUMMARY

Various embodiments described herein are directed to control methods for ascertaining and enforcing traffic or toll violations in such road toll systems. Some embodiments include a control method for a road toll system that is based on on-board units carried by vehicles having vehicle license plate numbers, using at least one recording vehicle and at least one control vehicle, which have unique identifiers and are connected to a switching server via a cellular mobile communication network, the method comprising: registering an identifier of a recording vehicle and a current mobile communication network cell identifier thereof in the switching server; selecting a cell identifier in a control vehicle and transmitting the selected cell identifier and the identifier of the control vehicle to the switching server; associating the control vehicle identifier with the recording vehicle identifier for which a cell identifier that is identical to the selected cell identifier is registered; detecting a traffic or toll violation of an on-board unit or of a vehicle carrying the same and reading the vehicle license plate number by means of the recording vehicle; transmitting a violation data record, containing the read license plate number and the recording vehicle identifier, to the switching server, determining the assigned control vehicle identifier, and transmitting the violation data record to the control vehicle identified by the determined identifier; and reading the license plate number of a passing vehicle by means of the control vehicle, comparing the read license plate number to the license plate number contained in the violation data record, and outputting an alert message if the license plate numbers agree with each other.

Various embodiments described herein use a distributed control system, which comprises a first fleet of recording vehicles ("hunters") and a second fleet of control vehicles ("gatherers"), which communicate with each other via a common switching server. The "hunters" are well-equipped for automatic violation detection and in some embodiments are not required to take any further action for violating vehicles than that of generating violation data records; their interactions with the controlled vehicles are brief, and consequently they can move about quickly and even check vehicles traveling at high speed or in opposing traffic, and their number can be kept low, whereby the overall equipment costs are contained. The "gatherers" may include comparatively little equipment because they do not ascertain violations, but only read vehicle license plate numbers, search for associated violation data records and issue alerts for violating vehicles. The crew of the control vehicle can then, for example, stop the violating vehicle and conduct a local manual check. Because of the low equipment requirements, control vehicles (gatherers) can be provided in large numbers and can thus also specifically conduct time-consuming local inspections. For example, existing fleets of special-purpose vehicles, such as emergency vehicles, means of public transportation, taxis and the like, can be converted into control vehicles and perform the control functions thereof in mobile fashion in moving traffic, and in stationary fashion in stopped traffic, while a few complex recording vehicles (hunters) continually move through moving traffic in a highly mobile fashion and generate violation data records. As a result, automatic controls of on-board units themselves can be carried out even in large, broadly branched road systems that contain high-speed and opposing traffic routes.

The use of cell identifiers of a cellular mobile communication network for associating the territories with hunters and gatherers allows location anonymization by providing very rough and vague location information as to the positions of the hunters; the locations of the gatherers remain generally secret. The gatherers can subscribe to or book violation data records from hunters in a desired mobile communication cell, wherein the selection of the desired mobile communication cell is left solely up to the gatherer. Even intercepting the mobile communication network communication between hunters, the switching server and gatherers, or a data leak in the switching server, would thus provide no concrete information about the positions of the hunters, and no information at all about the positions of the gatherers. Misuse of the system, as that which could, for example, occur if the current positions of control vehicles were published on the Internet or on radio shows, is thereby prevented with a high level of certainty and the effectiveness of the control method is considerably increased.

The respective current cell identifier of a recording vehicle can be determined directly by the same, for example by querying received data or configuration data of its mobile communication network transceiver, and can be transmitted to the switching server. As an alternative, the current cell identifier of a recording vehicle could also be determined by the switching server based on information that the server receives from or queries on the mobile communication network, for example by communicating with the switching center (mobile switching center, MSC) or base stations (base station transceivers, BST) of the same.

According to a first embodiment, the selection of the cell identifier in the control vehicle is carried out by user selection. The user can look up the cell identifier of a mobile communication network cell in charge of a particular geographical area, for example based on maps and tables, and transmit it to the switching server via an input unit and the mobile communication network transceiver. In some embodiments, the cell identifiers registered in the switching server are transmitted to the control vehicle—either on request or periodically—where they are displayed to the user for user selection. In addition, it would be possible to also transmit the control vehicle identifiers registered for the cell identifiers and display them to the user, so that the same receives information, for example, as to how many control vehicles are presently located in a particular mobile communication cell.

The selectable cell identifiers (and, in some embodiments, the corresponding registered control vehicle identifiers) can be displayed to the user both in a list and on a display, possibly in graphically edited form, as regions of a digital map, so as to facilitate the selection.

In a second embodiment, the control vehicle itself—for example, by querying configuration data or received data of the mobile communication network transceiver thereof—determines its own current mobile communication network identifier, and the same is used as the selected cell identifier for transmission to the switching server. The gatherers (recording vehicles) thus basically subscribe automatically to the violation data records of the hunters (control vehicles) located in the same mobile communication cell, without concrete position information about the locations of hunters or gatherers being exchanged and subjected to the risk of data abuse.

The recording vehicle can determine the violation location itself, for example by means of a satellite navigation receiver, or receive it directly from the on-board unit that is being checked, for example if the same comprises a dedicated position determination unit or learns of the position thereof in another manner, for example from a stationary radio beacon.

The methods described herein are suited both for (DSCR) OBUs of the externally located type that already comprise a DSRC radio interface, and for (GNSS) OBUs of the self-locating type that additionally comprise a DSRC radio interface for control and setting purposes.

The number of control vehicles may be considerably higher than that of recording vehicles, in particular may be higher by at least a power of ten.

The violations detected by the recording vehicle can include all types of toll or traffic violations that can be automatically detected, for example speeding violations detected by means of a speed measuring unit of the recording vehicle, bans on driving (including time-based bans) detected by means of a vehicle detection unit of the recording vehicle, and the like. The violations may be toll violations, and in particular such which can be ascertained based on a toll parameter that can be read out from the on-board unit via the DSRC radio interface. Such toll parameters can be arbitrary and provide information, for example, about the deployment purpose of the vehicle (for example emergency vehicle, means of public transportation, private vehicle, truck and the like), the status of the user of the vehicle, the size, weight, emission class, number of axles of the vehicle, or the relationship between the (user-specific) on-board unit and the physical vehicle (referenced via the license plate, for example) and the like. Any time a toll is calculated, be it during communication with a toll beacon or the calculation of toll transactions from reported positions, the toll parameters of the OBU are employed so as to determine the amount of the toll—or whether an obligation to pay the toll even exists.

Some embodiments are thus characterized in that the detection in the recording vehicle takes place in that the DSCR radio interface reads out at least one toll parameter from the on-board unit and the toll parameter is checked for accuracy.

Still further embodiments relate specifically to checking vehicle shape-specific toll parameters. Such vehicle shape-specific parameters, which determine the amount of a road toll to be paid, can be, for example, the dimensions of the vehicle, the current number of axles (with or without trailer), a particular body design such as a truck or passenger car, and the like, and can be set or stored as toll parameters in an on-board unit. So as to detect abusive faulty settings of such toll parameters, the recording vehicle comprises a DSRC transceiver for reading out the toll parameter of a passing vehicle and a sensor for detecting a shape parameter of the vehicle, wherein the recording vehicle is configured to verify that the toll parameter is consistent with the shape parameter and, in the event of inconsistency, to transmit the violation data record, including the violation location and license plate number read result of the vehicle, to the switching server.

As an alternative or in addition, the recording vehicle can be equipped with a unit for measuring the speed, and possibly the driving direction of a passing vehicle, so as to also determine the traffic or toll violation based on these measured values.

As described, the detected shape parameter or the read-out toll parameter can be the vehicle length or number of axles, in particular broken down according to classes ("classified"). The shape parameter of a vehicle to be controlled can be detected in a wide variety of ways, for example using an electronic camera containing object recognition software, using a radar detector for vehicle measurement or detection of the wheels of the same, or using a laser rangefinder or laser scanner, which detects at least a portion of the shape of the vehicle by scanning the same as it passes. A 2D or 3D image (profile or "point cloud" of laser distance measurement points) of at least a portion of the vehicle is created by the relative movement between the recording vehicle and the controlled vehicle, and based thereon the shape parameter can be obtained, for example by means of object recognition software, for example as a vehicle length or number of axles, based on which, for example, a conclusion can be drawn of a certain vehicle class (passenger car, truck, truck with trailer, and the like).

BRIEF DESCRIPTION OF THE FIGURES

Additional characteristics and aspects of the methods and apparatuses will be apparent from the following description of various embodiments, which references the accompanying drawings, in which:

FIG. 1 is a schematic illustration of a road toll system 1, in which a plurality of vehicles 2 that are subject to tolls move about on a road system, which is not shown in detail, for example a nationwide road system. The road toll system 1 is used to charge tolls (fees) for arbitrary road usages by the vehicles 2, and more specifically both usages of traffic areas of moving traffic in form of roadway, territory, passage or border tolls, and of traffic areas of stopped traffic in form of visitation or parking fees.

Figure 1:
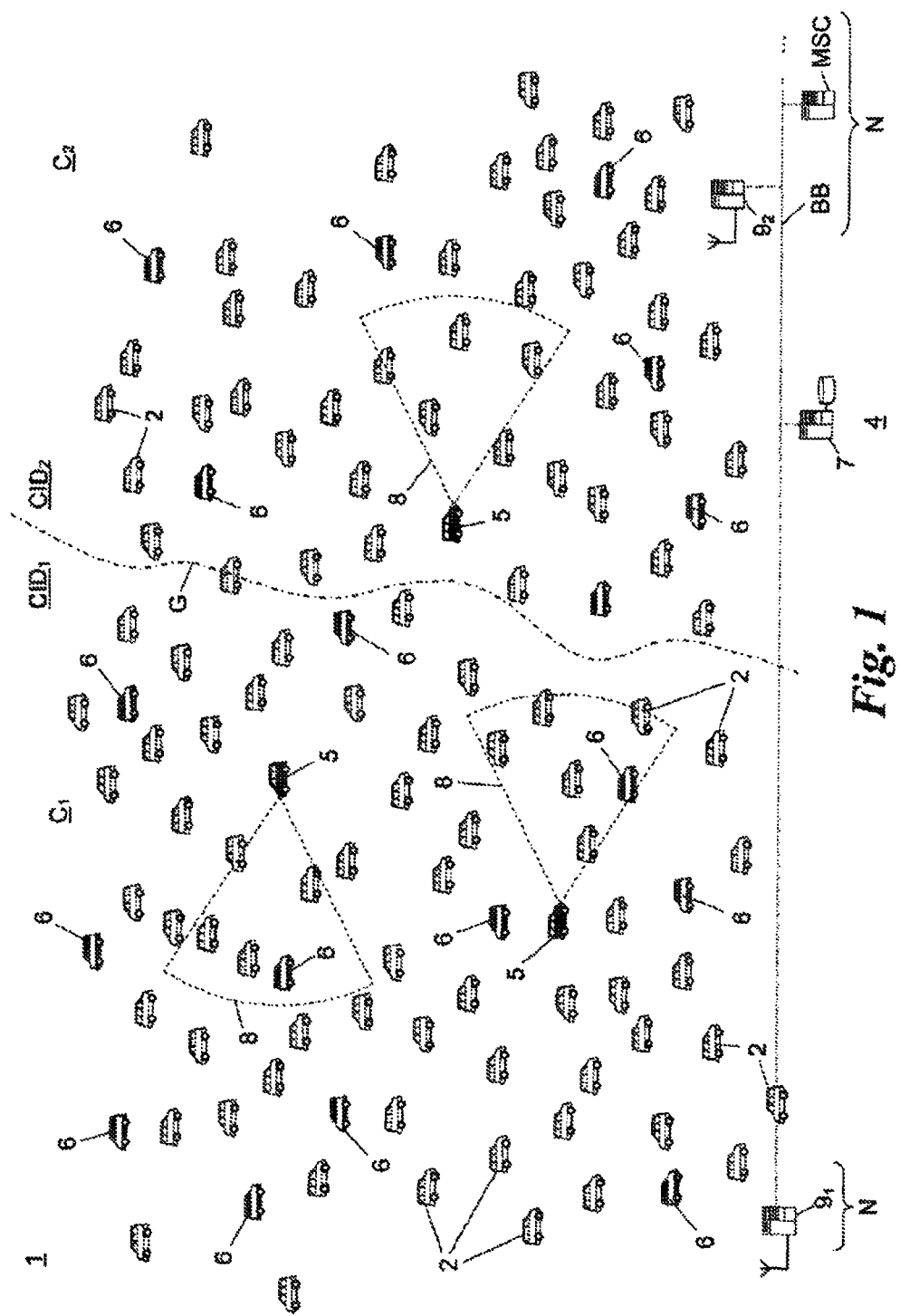
FIG. 1 shows a schematic overview of the operating principle of an embodiment of the control devices and of the control methods in a vehicle population of a road system and in a cellular mobile communication network.

For this purpose, according to FIGS. 2 and 3 all vehicles 2 that are subject to tolls are equipped with on-board units (OBUs) 3, which can be used to locate the vehicles 2 and consequently they can be charged tolls. The OBUs 3 can take on a variety of designs: The OBUs 3 can be of the "self-locating" type, which is to say, they can continually determine the locations thereof themselves, for example by means of a satellite navigation receiver as part of a satellite navigation system (global navigation satellite system, GNSS) and report the locations thus determined ("position fixes") either directly to a back office 4 of the road toll system 1, be it via a mobile communication network or a network of geographically distributed radio beacons, or in the form of "abstracted" toll transactions, which are calculated based on the reported positions. As an alternative, such GNSS OBUs 3 could simply store the reported positions or toll transactions thereof, or debit the fees calculated based thereon from an internal toll credit account. The OBUs 3 can also be of the "externally located" type, for example using a plurality of toll or radio beacons which are geographically distributed over the road toll system 1 and which establish the respective short range communication or DSRC (dedicated short range communication) with passing OBUs 3 and localize the known beacon locations thereof due to the limited communication range. Corresponding reported positions, or toll transactions calculated based thereon, can then be generated by the OBUs 3 or the toll beacons and processed either in the OBUs 3 or in the back office 4.

So as to correctly calculate the toll in the road toll system 1, one or more toll parameters OC that are specific to the respective vehicle 2 are set or stored in the OBUs 3. The toll parameters OC can be of any arbitrary type and can, for example, provide information about the deployment purpose of the vehicle 2 (for example emergency vehicle, means of public transportation, private vehicle, truck and the like), the status of the user of the vehicle 2, about the size, weight, emission class, number of axles of the vehicle 2 with or without trailer, and the like. Any time a toll is calculated, be it during communication with a toll beacon or the calculation of toll transactions from reported positions, the toll parameters OC of the OBU 3 are employed so as to determine the amount of the toll—or whether an obligation to pay the toll even exists.

Hereafter, toll parameters OC that are considered include those which can be validated (cross-checked) by checking the exterior appearance, which is to say the shape of the vehicle 2 which carries the OBU 3. Such toll parameters OC are referred to as vehicle shape-specific in this description. Vehicle shape-specific toll parameters OC can, for example, include one or more dimensions of the vehicle 2, the body design thereof (boxy body, platform body, passenger car or truck body), number of axles, number of trailers, and the like.

The control devices and methods described hereafter are suitable for those OBUs 3, the vehicle shape-specific toll parameters OC of which set or stored therein can be read out via a DSRC radio interface, as is the case, for example, with DSRC OBUs according to the RFID, CEN-DSRC, UNI-DSRC, ITS-G5 or WAVE (wireless access in a vehicle environment) standards. GNSS OBUs 3, which additionally contain a DSRC radio interface for read-out of the toll parameters thereof for control purposes, are also suited and can be checked in the manner described below.

Moreover, the control devices and methods described herein are, of course, also able to ascertain whether a vehicle 2 that is subject to toll is even equipped with an OBU 3 and—since the read-out of toll parameters requires a correctly functioning OBU 3—check the functionality of an OBU 3.

Finally, the described control devices and methods are also able to detect and enforce general traffic violations of the vehicles 2, such as speeding violations, transgressions of (night) driving bans and other traffic offenses, insofar as they can be automatically detected by means of measuring units, sensors and the like.

A control device is used in the road toll system 1 for the aforementioned control purposes, which is composed of a first fleet of recording vehicles 5, a second fleet of control vehicles 6, and a switching server 7 in the back office 4.

In some embodiments a considerably higher number of control vehicles 6 than recording vehicles 5 is provided. The ratio of the number of control vehicles 6 to recording vehicles 5 may be at least 10:1, and possibly 100:1, 1000:1 and more. As will be described below, control vehicles 6 have a simpler design than recording vehicles 5 and are operated with a different movement behavior, which results in a balanced coverage ratio of the spheres of action of recording and control vehicles at minimal costs. The recording vehicles 5 move continually in flowing traffic, and the interactions thereof with the vehicles 2 to be controlled are brief, while the control vehicles 6 can be used both in mobile and in stationary fashion and have longer interactions with the vehicles 2 being controlled if they conduct stop checks or enforce toll violations.

As is shown in the overview in FIG. 1, the recording vehicles 5 are used to track down vehicles 2 that commit a traffic or toll violation, for example a speeding violation, or that contain a faulty or incorrectly set OBU 3, or none at all, in the respectively defined detection ranges, and transmit this information as a traffic or toll violation in form of a violation data record to the switching server 7; the interactions that take place for this purpose between the recording vehicle 5 and the vehicle 2 will be described in more detail hereafter based on FIGS. 2 and 4. The control vehicles 6 are used to check vehicles 2 that are located in the respective vicinity with respect to the violation data records that are received for these vehicles and to issue an alert message if a violation data record exists for a vehicle 2. The crew of the control vehicle 6 can then take the appropriate further verification and enforcement measures, for example stop the vehicle 2, conduct a traffic check, charge a subsequent toll, impose a fine and the like. The interactions that take place for this purpose between the control vehicle 6, the switching server 7 and the vehicle 2 will be described in more detail hereafter based on FIGS. 3 and 4.

The recording vehicles 5, the control vehicles 6 and the switching center 7 are connected to each other for this purpose via a cellular mobile communication network N, and more particularly via a GSM, UMTS or LTE network, and via packet-switched connections. The cellular mobile communication network N comprises a plurality of geographically distributed base stations $9_1, 9_2, \ldots$, or in general $9_i$, which are each in charge of a geographical region ("cell") $C_i$. FIGS. 1 and 2 show exemplary base stations $9_1$, $9_2$ and the mobile communication network cells $C_1$, $C_2$ thereof, which are delimited by a dotted boundary line G.

Conventionally, the mobile communication network N comprises one or more switching centers MSC, to which the base stations $9_i$ are connected via a data network (backbone) BB, as in known in the prior art. The switching server 7 can be directly connected to the data network BB or to a mobile switching center MSC, or it can directly communicate wirelessly with one of the base stations $9_i$. The switching server 7 can also be implemented directly by a switching center MSC or by a billing back office 4 of the road toll system 1.

As is known to a person skilled in the art, every cell $C_i$ in the mobile communication network N is identified by a unique cell identifier $CID_1$, $CID_2$, ..., or in general $CID_i$. The cell identifier $CID_i$ of every cell $C_i$ in which a network subscriber, such as a recording vehicle 5 or control vehicle 6, is presently located, is known in the mobile communication network N of both the switching center MSC and of the respective network subscriber 5, 6 and is used within the scope of the present method to associate the geographical deployment areas of recording vehicles 6 and control vehicles 6, as will be described in more detail hereafter.

Figure 2A:
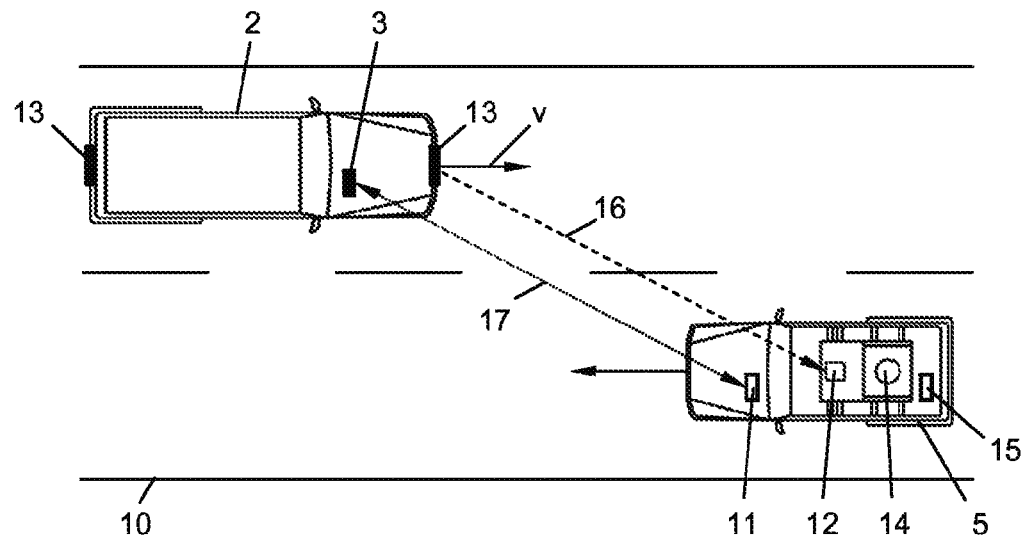
FIGS. 2a and 2b show different device components and method steps when a vehicle to be controlled passes a recording vehicle.
Figure 2B:
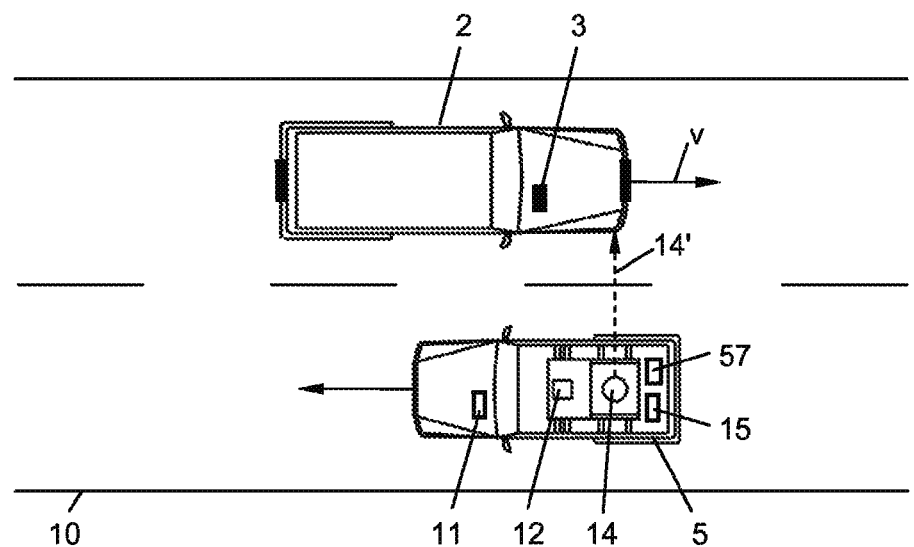

FIGS. 2a and 2b show one of the recording vehicles 5 in detail at two consecutive times as a vehicle 2 on a road 10 passes in opposing traffic. The recording vehicle 5 is equipped with a DSRC transceiver 11 for DSRC radio communication with the OBU 3 of the vehicle 2, a license plate number read unit 12 for automatically reading (optical character recognition, OCR) a license plate 13 of the vehicle 2, and a sensor 14, which here is a laser scanner, for detecting a parameter of the outside shape of the vehicle 2, which hereinafter is referred to as the shape parameter CL. The recording vehicle 5 is further equipped with a mobile communication network transceiver 15 for communicating in the mobile communication network N, as described above.

In the present example, the shape parameter CL is a vehicle class ("passenger car", "truck with two axles", "truck with three axles", "truck with four axles", "truck with trailer", and the like); however, of course any other property of the outside shape of the vehicle 2 which can be determined by way of the sensor 14 can serve as the shape parameter CL, similarly to the aforementioned vehicle shape-specific toll parameter OC.

The sensor 14 for detecting the shape parameter CL can be designed in any manner that is known from the prior art, for example in form of an electronic camera, which can record one or more images of the passing vehicle 2, including from different viewing angles, with these images then being used to extract corresponding properties and shape parameters of the vehicle 2 by means of image recognition software. As an alternative, the sensor 14 can be a radar or laser rangefinder or scanner, which scans the vehicle 2 as it passes using a radar or laser beam or fan 14' so as to detect one or more dimensions or contours of the passing vehicle 2 in form of a scanning profile of a scanning point cloud.

The license plate number read unit 12 of the recording vehicle 5 carries out an OCR read process known from the prior art of an official license plate number LPN on the license plate 13 of the vehicle 2 ("automatic license plate number recognition", ALNR); the imaging path or information flow is shown schematically with the arrow 16.

The DSRC transceiver 11 of the recording vehicle 5 establishes DSRC radio communication 17 with the OBU 3 so as to a) ascertain whether an OBU 3 is even present in the vehicle 3, b) thereby (implicitly) check whether the OBU 3 responds, which is to say functions correctly, and c) read out the toll parameter OC set or stored in the OBU 3 for the further examination. During this examination, the read-out toll parameter OC of the OBU 3 should be consistent with the shape parameter CL of the vehicle 2 detected by the sensor 14. For example, if the toll parameter OC indicates "three-axle truck", the sensor 14 should also detect a shape parameter CL that is consistent therewith; if not, a toll violation exists and the vehicle 2 is a "violating vehicle".

Of course, a toll parameter OC that is read out from the OBU 3 can additionally be dependent on components other than the vehicle shape, for example the status or usage purpose of the vehicle 2, the time, the general temporal conditions (for example night driving ban), vehicle emission class restrictions, speeds, and the like, which can likewise be taken into consideration when checking the violation.

All components, these being the DSCR transceiver 11, license plate number read unit 12, and sensor 14, of the recording vehicle 5 are connected to each other—via a control unit, in some embodiments (not shown)—and the recording vehicle 5 can, as described, communicate with the central switching server 7 wirelessly via the mobile communication network transceiver 15.

Figure 3A:
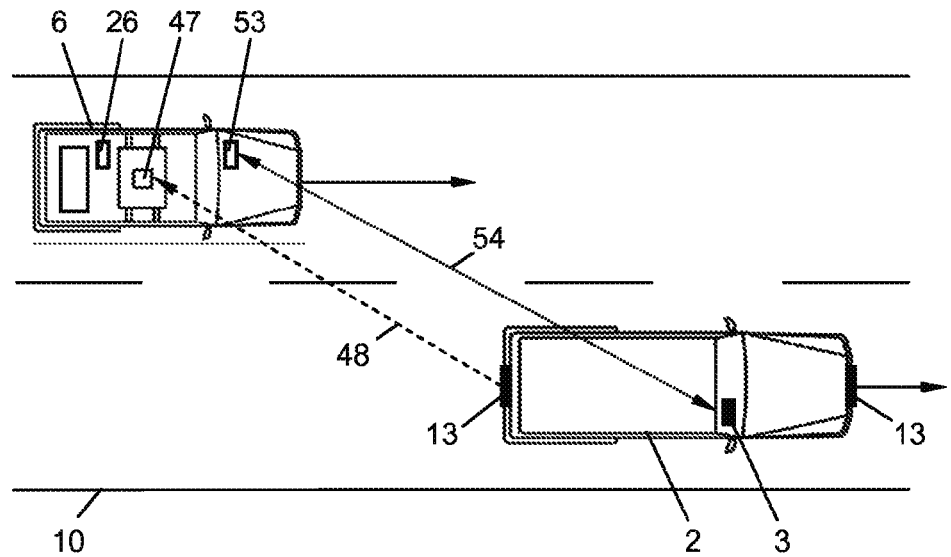
FIGS. 3a and 3b show different device components and method steps when a vehicle to be controlled passes a control vehicle.
Figure 3B:
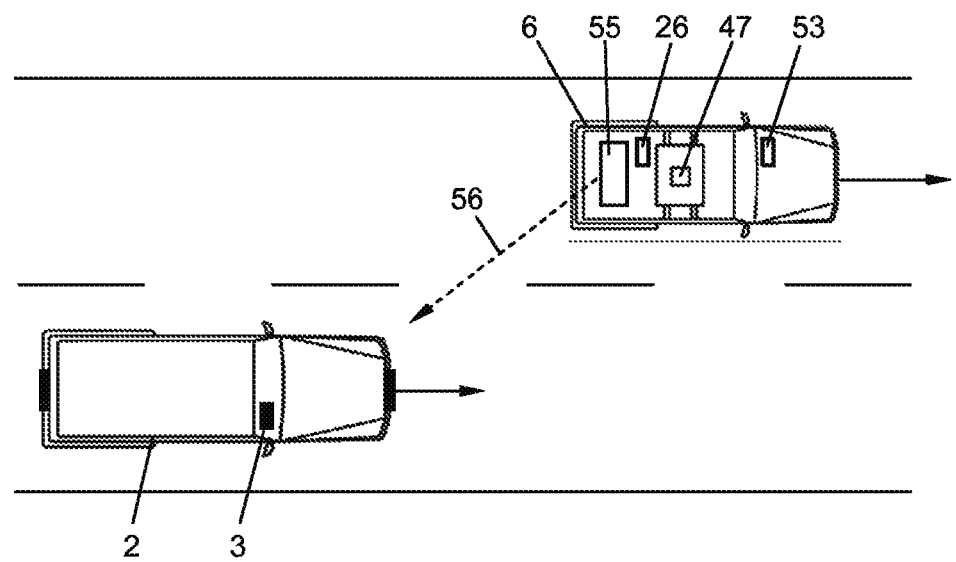
Figure 4A:
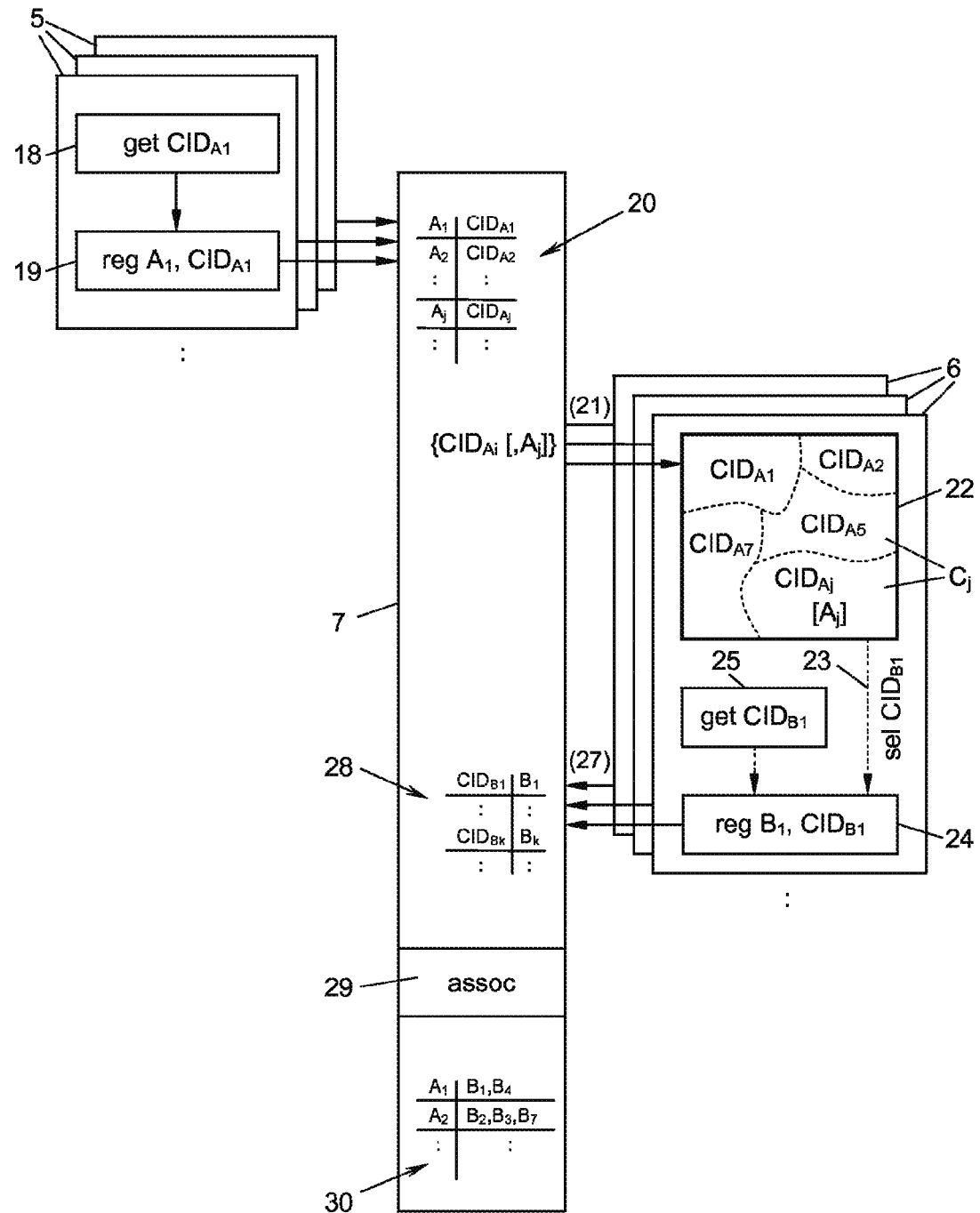
FIGS. 4a to 4c show flow charts of one embodiment of a method.
Figure 4B:
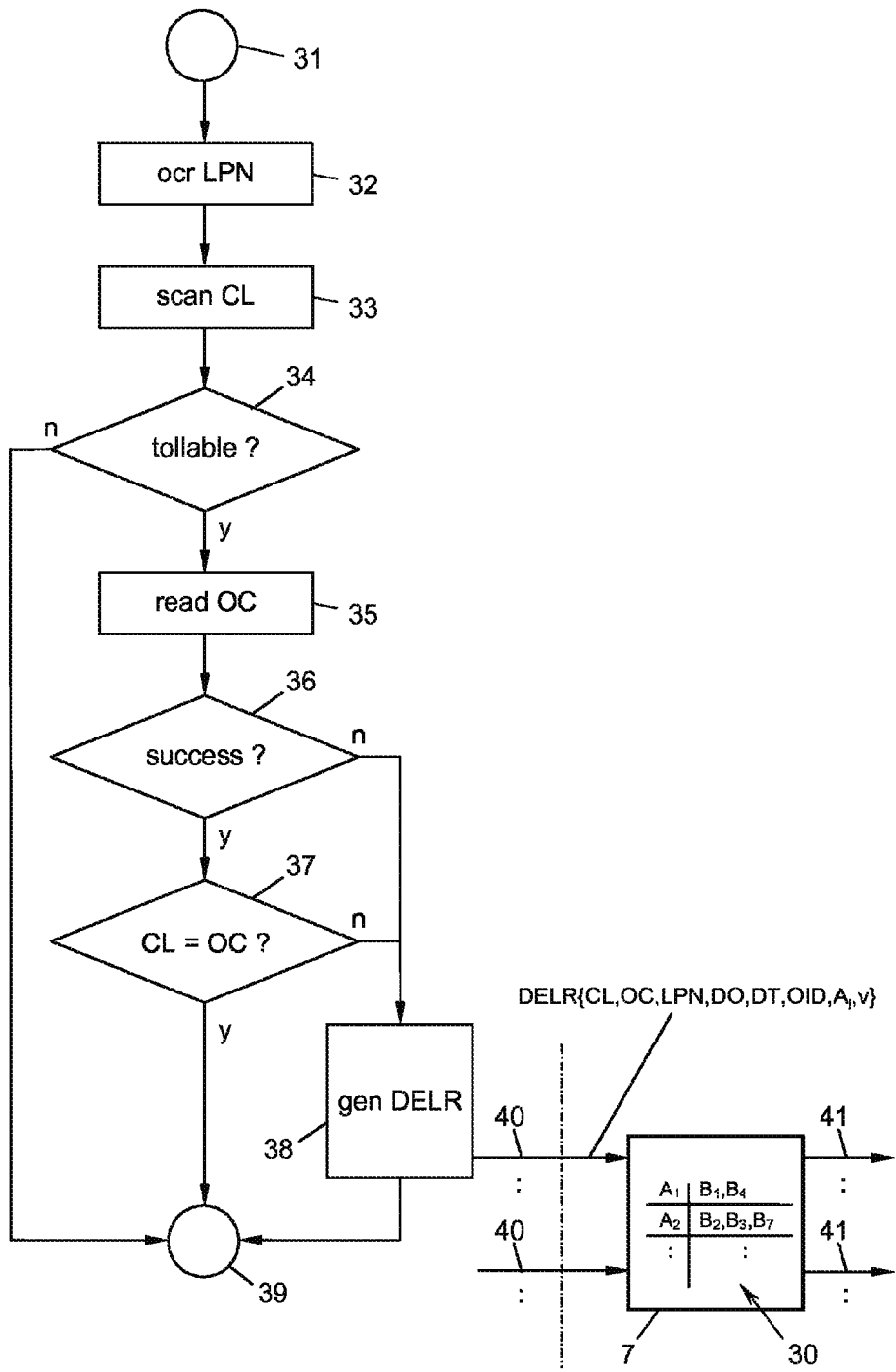
Figure 4C:
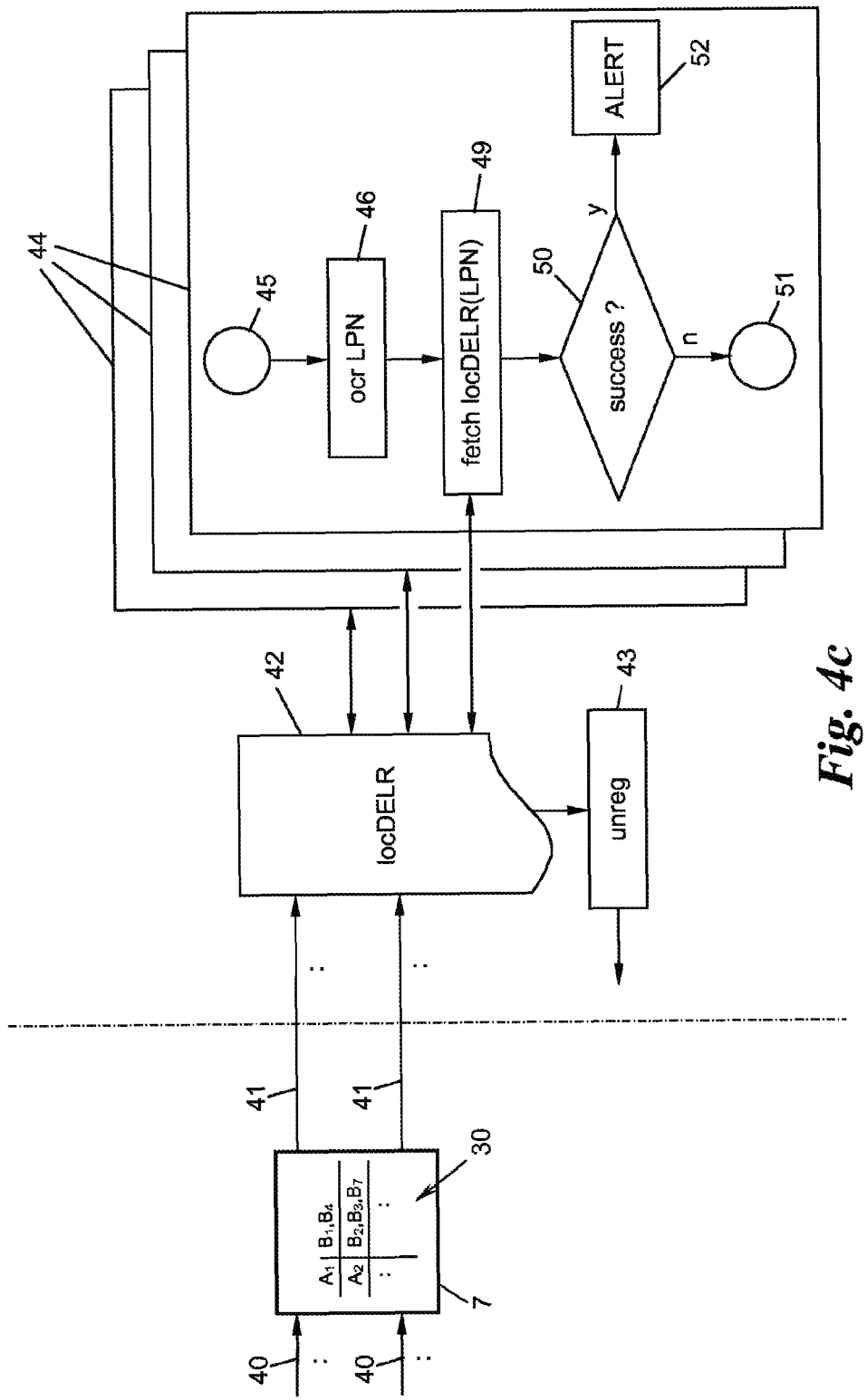

The control method, which is carried out with the help of the recording vehicles 5, control vehicles 6 and switching server 7, will be described in more detail hereafter based on FIG. 4 referencing FIGS. 2 and 3. FIG. 4a shows the initial registration, selection and association phases of the method in preparation for the subsequent recording phases (FIGS. 2, 4b) and control phases (FIGS. 3, 4c).

According to FIG. 4a, in a first step 18, each recording vehicle 5 determines the cell identifier $CID_{A1}$ of the cell $C_i$ of the mobile communication network N in which it is presently located. The cell identifier $CID_{A1}$ can, for example, be read out from communication parameters of the transceiver 15.

In a subsequent step 19, the recording vehicle 5 registers under a respective unique recording vehicle identifier $A_1$, $A_2$, ..., or in general $A_j$, with the respectively determined cell identifier $CID_{A1}$, $CID_{A2}$, ..., or in general $CID_{Aj}$, in the switching server 7. The unique identifier $A_j$ of a recording vehicle 5 can have any arbitrary form, for example the vehicle license plate number, an identification of the user of the recording vehicle 5, for example name, account or credit card number, an identifier of an on-board unit of the recording vehicle 5, an identification of the mobile communication network transceiver 15 thereof in the mobile communication network N, for example telephone number, IMSI, TIMSI, IMEI and the like.

Instead of the recording vehicle 5, in step 18, determining the cell identifier $CID_{Aj}$ thereof, this can also be carried out or initiated from the switching server 7, for example by the switching server 7 requesting the cell identifier $CID_{Aj}$ from the switching center MSC or a base station $9_i$ of the mobile communication network N.

Of course, the recording vehicles 5 can accordingly update the respective cell identifier registrations $\{A_j, CID_{Aj}\}$ in the switching server 7 when switching the cell $C_i$, or they can also periodically update them, and accordingly de-register again, for example when leaving the mobile communication network N. The switching server 7 thus has at its disposal a continually updated table 20 of recording vehicles 5 that move about in the mobile communication network N, including the respective identifiers $A_j$ and cell identifiers $CID_{Aj}$.

In subsequent steps 21, control vehicles 6 can thus retrieve the respective cell identifiers $CID_{Aj}$ that are currently stored ("assigned") in the switching server 7 in the table 20, which in some embodiments, may be supplemented by the respective registered recording vehicle identifiers $A_j$. The transmission step 21 can, for example, be carried out at the request of a control vehicle 6 or periodically proceeding from the switching server 7.

In the control vehicles 6, the cell identifiers $CID_{Aj}$ thus obtained are displayed to the user of the control vehicle 6 for selection. This can take place in form of a list in table form on an output device (monitor, display) in the control vehicle 6, such as on a screen 22 using a digital map which is stored in the control vehicle 6 or the switching server 7 and in which the cells $C_j$, along with the cell identifiers $CID_{Aj}$ thereof, are displayed as geographical regions with the respective boundaries G thereof. In some embodiments, the recording vehicle identifiers $A_j$ registered in a particular cell $C_j$, which is to say the recording vehicles 5 present there, can be listed.

Based on the information provided on the screen 22, the user of the control vehicle 6 can now select one (or more) cell identifier(s). The cell identifier(s) selected in a control vehicle 6 and the control vehicle identifier $B_1, B_2, \ldots$, or in general $B_k$, is/are referred to hereafter as $CID_{B1}, CID_{B2}, \ldots$, or in general $CID_{Bk}$.

The step of manually selecting the respective cell identifier(s) $CID_{Bk}$ is shown in dotted fashion at 23 and leads to a step 24, in which the selected cell identifier(s) $CID_{Bk}$, together with the identifier $B_k$ of the control vehicle 6, are transmitted (27) to the switching server 7.

The control vehicle identifier $B_k$ can again be of any arbitrary type, as mentioned previously in connection with the recording vehicle identifier $A_j$, and is used to uniquely identify the respective control vehicle 6 in the mobile communication network N. Of course, the control vehicles 6 can also transmit corresponding deselection or de-booking messages 27 (or 43, refer to FIG. 4c) to the switching server 7 if they have no longer selected (booked) a particular cell identifier $CID_{Bk}$.

The switching server 7 thus has at its disposal a current table 28 of cell identifiers $CID_{Bk}$ selected by a control vehicle 6 having the identifier $B_k$, wherein a control vehicle 6 can also have more than one selected cell identifier $CID_{Bk}$.

In a subsequent association step 29, control vehicle identifiers $B_k$ can be associated in the switching server 7 with those recording vehicle identifiers $A_j$ for which a cell identifier $CID_{Aj}$ that is identical to the selected cell identifiers $CID_{Bk}$ is registered. The selected cell identifiers $CID_{Bk}$ of the table 28 are thus checked as to whether they appear in the registration table 20, and if they appear there, the respective control vehicle identifier $B_k$ is assigned to the respective recording vehicle identifier $A_j$. As a result, control vehicles 6 (gatherers) quasi "book" or "subscribe to" recording vehicles 5 (hunters) for subsequently obtaining violation data records, which will be described in more detail based on FIGS. 4b and 4c. The association step 29 thus results in an assignment table 30 in the switching server 7, the table containing the "subscription" control vehicles 6 having the control vehicle identifier $B_k$—in relation to the cell identifiers $CID_j$—for a recording vehicle 5 having the recording vehicle identifier $A_j$.

In a simplified embodiment, the map-like formatting of the mobile radio cells $C_j$ on the screen 22 can be eliminated, and the cell identifiers $CID_{Aj}$, which can be selected in step 21, can be output, for example, in form of a list. As an alternative, the step 21 and the output on a display 22 can be completely eliminated, and the user personally selects, for example based on maps, reference tables and the like, a cell identifier $CID_{Bk}$ in step 23, regardless of whether or not recording vehicles 5 are currently present in the corresponding cell $C_j$.

In a further embodiment, a cell identifier $CID_{Bk}$ can also be automatically selected by the control vehicle 6, see step 25, instead of the manual selection step 23 and the prior steps 21,  22 in some embodiments where those steps are present. In step 25, the control vehicle 6 determines, for example, its own cell identifier $CID_{Bk}$ in the mobile communication network N (similar to step 18), for example by querying communication parameters of its own mobile communication network transceiver 26 (FIG. 3), and supplies these as the "selected" cell identifier $CID_{Bk}$ to the booking and association steps 24, 27, 29. The control vehicle 6 thus subscribes to the recording vehicles 5 that are present in its own mobile communication network cell $C_k$.

The operating principle of the recording vehicle 5 and the recording process that takes place when a vehicle 2 passes will now be described in more detail with reference to FIGS. 2 and 4b. When the vehicle 2 approaches the recording vehicle 5 (step 31), in a first step 32 the license plate number LPN of the vehicle 2 is read from the license plate 13 using a license plate number read unit 12 (arrow 16). The step 32 can also be carried out at any later time of the method of FIG. 4b, as long as the license plate number read result LPN is not yet required, for example this can be done at a later time by reading the rear license plate 13 of the vehicle 2.

Subsequently, in a step 33, the shape parameter CL of the vehicle 2 is detected by way of the sensor 14, in the example shown this is done by laser scanning and detecting the number of axles of the vehicle 2, based on which an axle-based vehicle class ("class") is determined as the shape parameter CL.

In a subsequent decision step 34, it is checked based on the shape parameter CL whether or not the vehicle 2 is even subject to tolls. Two-axle vehicles 2, for example, can be defined as not being subject to tolls, and vehicles 2 with more than two axles can be defined as being subject to tolls. If the shape parameter CL indicates an obligation to pay tolls (branch "y"), in the subsequent step 35 contact is established with the OBU 3 using the DSRC transceiver 11 (arrow 17). The toll parameter OC is read out from the OBU 3 for this purpose, and a successful read-out also indicates that the OBU 3 is present and functioning. The subsequent decision step 36 then switches directly to step 38 for generating a violation data record step DELR if the read-out fails (branch "n").

Otherwise (branch "y" of step 36), it is checked in the further decision 37 whether the detected shape parameter CL and the read-out toll parameter OC match or are consistent with each other, which is to say the toll parameter OC of the OBU 3 is set such that it corresponds to the shape parameter CL that has been detected based on the outside shape of the vehicle 2. If so (branch "y"), everything is fine and the method ends at 39. If not (branch "n"), an inconsistency exists, which constitutes a potential toll violation, and the process switches to step 38 for generating the violation data record DELR.

In step 38, the violation data record DELR is generated, which contains the detected shape parameter CL, the read-out toll parameter OC and the license plate number read result LPN, and, in some embodiments, other data such as the current location ("location of the violation") DO and the current time ("time of the violation") DT of the recording process, additional master data read out from the OBU 3 such as the OBU identifier OID, user master data, vehicle master data and the like. The violation data record DELR also contains the identifier $A_j$ of the respective control vehicle 5.

The location of the violation DO can be determined in a wide variety of ways: The recording vehicle 5 can be equipped with a separate position determination unit, for example a satellite navigation receiver, and record the current location of the vehicle's passage as the location of the violation DO. As an alternative, the OBU 3, in particular if it is of the self-locating type, can make the current position thereof available to the recording vehicle 5 as the location of the violation DO. The known locations of neighboring radio beacons of a beacon-based road toll system 1 can also be used for approximation.

In the step 40, the violation data record DELR is then transmitted to the switching server 7 for forwarding (step 41) to the control vehicles 6.

Of course steps 32 to 37—provided they do not require each other—can also be carried out in a different order.

The steps that take place in the switching server 7 and an exemplary control vehicle 6 will be described based on FIGS. 3 and 4c. FIGS. 3a and 3b show the situation as a control vehicle 6 passes a vehicle 2 to be controlled at two consecutive times. In preparation for (or during) such a check, the switching server 7 forwards to the control vehicles 6 those violation data records DELR which come from control vehicles 6 subscribed to in the association table 30. To this end, the switching server 7 uses the association table 30 for addressing purposes, so as to forward the violation data record DELR of a recording vehicle 5 having the identifier $A_j$ to all those control vehicles 6 having the identifiers $B_k$ which are recorded in the table 30. In the example shown, violation data records DELR of the recording vehicle 5 having the identifier $A_1$ are forwarded to the control vehicles 6 having the identifiers $B_1$, $B_4$; those of the recording vehicle 5 having the identifier $A_2$ are forwarded to the control vehicles having the identifiers $B_2$, $B_3$ and $B_7$, and so forth.

A control vehicle 6 includes the violation data records DELR provided with in this way (step 41) in a local violation data record list locDELR 42.

The forwarding of the violation data records DELR in step 41 can take place both continually, for example periodically or as needed, for example in that the switching server 7 transmits each individual violation data record DELR to the respective control vehicle 6, or in batches (using batch processing), in that a control vehicle 6 picks up the violation data records DELR that are provided individually at a particular time from the switching server 7, or receives them transmitted from the server.

In embodiments with the time of the violation DT, the violation data records DELR also bear a respective "time stamp", which can limit the temporal validity of the records. For example, violation data records DELR that are "too old", which is to say those having time stamps DT that is outside a predetermined time period, can be automatically discarded, both in the switching server 7 and in the control vehicle 6, and/or the switching server 7 can forward only "current" violation data records DELR to a control vehicle 6, which is to say those having time stamps DT that are within a predetermined time period.

During the registration phase in FIG. 4a, the control vehicles 6 "subscribed to" violation data records DELR from recording vehicles 6 from selected mobile communication network cells $C_k$, until, in a step 43, they transmit a deselection or de-booking message 27 to the switching server 7, as described above. The control vehicles 6 are thus provided with the respective current violation data records DELR from the desired mobile communication network cell(s) $C_k$ and can, when a vehicle 2 passes or is checked, carry out control tasks 44 which utilize the respective local violation data record list 42.

According to FIGS. 3 and 4c, during every control task 44, as a vehicle 2 approaches (step 45), the license plate number LPN is automatically read in a first step 46 from the license plate 12 using a license plate number read unit 47 of the control vehicle 6 (arrow 48). Subsequently, in step 49, the control vehicle 6 picks a matching violation data record DELR from the local violation data record list 42, provided such a record exists. If no violation data record DELR exists for the license plate number read result LPN (branch "n" in checking step 50), the task 44 ends at 51, and the license plate number read result LPN can be deleted again, for example for confidentiality reasons. However, if a violation data record DELR exists for the license plate number read result LPN (branch "y"), the process branches off to the alert step 52, in which the control vehicle 6 issues an alert message to the crew.

The alert message can, for example, be an optical or acoustic alert, or a display on the screen 22, which also indicates the read license plate number LPN and the violation data record DELR. The crew can then take appropriate enforcement measures, for example stop the vehicle 2, further check the OBU 3, and, in some embodiments, may levy a subsequent toll or impose a fine. The alert message can additionally be automatically displayed on a signaling unit 55 of the control vehicle 6 which is outwardly visible for the checked vehicle 2 (arrow 56), so as to prompt the same to stop, for example, using fluorescent lettering "STOP".

In some embodiments, in task 44 additionally the OBU 3 also may be again read out using the DSCR transceiver 53 of the control vehicle 6 (arrow 54), for example for further consistency checks or identifications.

The recording vehicle 5 can, in some embodiments, be equipped with a unit 57 for measuring the speed and the driving direction, which is to say the movement vector v, of a vehicle 2. The unit 57 can also be implemented by a license plate number read unit 12 which is designed as a video camera and in the images of which movements can be detected, or by a DSRC transceiver 12 designed as a Doppler radar, or by appropriate measurements using the sensor 14, for example laser or LIDAR measurements on the scanning beam or fan 15.

The speed measuring units 11, 12, 14, 57 of the recording vehicle 5 can moreover be used to detect general traffic violations of the vehicles 2, for example to detect speeding violations. The movement vector v of the vehicle 2 at the time of the violation DT can be integrated in the violation data record DELR.

The invention is thus not limited to the shown embodiments, but encompasses all variants and modifications that are covered by the scope of the accompanying claims. In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the systems may be implemented using a general purpose or dedicated processor device running a software application or program code stored in volatile or non-volatile memory devices. Devices so programmed may be used to perform the methods described herein. Also, the hardware objects could communicate using electrical signals, with states of the signals representing different data.

It should be further understood that these and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. A control method for a road toll system that is based on on-board units carried by vehicles having vehicle license plate numbers, using at least one recording vehicle and at least one control vehicle that have unique identifiers and are connected to a switching server via a cellular mobile communication network, the method comprising:
registering an identifier of a recording vehicle and a current mobile communication network cell identifier thereof in the switching server;
selecting a cell identifier in a control vehicle and transmitting the selected cell identifier and the identifier of the control vehicle to the switching server;
associating the control vehicle identifier with the recording vehicle identifier for which a cell identifier that is identical to the selected cell identifier is registered;
detecting a traffic or toll violation of an on-board unit or of a vehicle carrying the same and reading the vehicle license plate number thereof by the recording vehicle;
transmitting a violation data record, containing the read license plate number and the recording vehicle identifier, to the switching server, determining the assigned control vehicle identifier, and transmitting the violation data record to the control vehicle identified by the determined identifier; and
reading the license plate number of a passing vehicle by means of the control vehicle, comparing the read license plate number to the license plate number contained in the violation data record, and outputting an alert message if the license plate numbers agree with each other.

2. The method according to claim 1, wherein the current cell identifier of the recording vehicle is determined in the recording vehicle and transmitted by the same to the switching server.

3. The method according to claim 1, wherein the current cell identifier of the recording vehicle is determined in the switching server based on information from the mobile communication network.

4. The method according to claim 1, wherein the selection of the cell identifier in the control vehicle is carried out by user selection.

5. The method according to claim 4, wherein the cell identifiers registered in the switching server are transmitted to the control vehicle where they are displayed to the user for user selection.

6. The method according to claim 5, wherein the selectable cell identifiers are displayed to the user on a display as geographical regions of a digital map.

7. The method according to claim 1, wherein the current mobile communication network cell identifier of the control vehicle is determined and used as the selected cell identifier.

8. The method according to claim 1, wherein, when the traffic or toll violation is detected, the location of the recording vehicle is determined by means of satellite navigation and added to the violation data record as the location of the violation.

9. The control method according to claim 1, wherein the following steps are carried out by the recording vehicle:
reading out a vehicle shape-specific toll parameter from an on-board unit of a passing vehicle by means of a DSRC transceiver;
detecting a shape parameter of the vehicle by means of a sensor;
checking the toll parameter for consistency with the shape parameter and, in the case of inconsistency, and,
transmitting the violation data record.

10. The method according to claim 9, wherein the shape parameter and the toll parameter are a respective vehicle length or a respective number of vehicle axles.

11. The method according to claim 9, wherein a laser scanner is used as the sensor.

12. The method according to claim 1, wherein at least one of the speed and the driving direction of a passing vehicle is/are measured in the recording vehicle and the traffic or toll violation is also determined based on this/these measured value(s).

* * * * *